| $\frac{J}{Jo}$ = | $\frac{Ub}{U}$ = +1 | $\frac{Ub}{U}$ = −1 | |
|---|---|---|---|
| $\frac{Ua}{U}$ = +1 | 0 | +2 | saz1 |
| +2 | +1 | +3 | saz2 |
| $-\frac{5}{2}$ | $-\frac{7}{2}$ | $-\frac{3}{2}$ | saz3 |
| | sbz1 | sbz2 | |

Fig. 3

| $\frac{J}{Jo}$ = | $\frac{Ub}{U}$ = 0 | $\frac{Ub}{U}$ = +1 | |
|---|---|---|---|
| $\frac{Ua}{U}$ = 0 | 0 | −1 | saz1 |
| +1 | +1 | 0 | saz2 |
| | sbz1 | sbz2 | |

Fig. 4

| $\frac{J}{Jo}$ = | $\frac{Ub}{U}$ = 1 | $\frac{Ub}{U}$ = −1 | |
|---|---|---|---|
| $\frac{Ua}{U}$ = 1 | 0 | 2 | saz1 |
| −1 | −2 | 0 | saz2 |
| | sbz1 | sbz2 | |

Fig. 7

| $\frac{J}{Jo}$ = | $\frac{Ub}{U}$ = −1 | 0 | +1 | |
|---|---|---|---|---|
| $\frac{Ua}{U}$ = −1 | 0 | −1 | −2 | saz1 |
| 0 | +1 | 0 | −1 | saz2 |
| +1 | +2 | +1 | 0 | saz3 |
| | sbz1 | sbz2 | sbz3 | |

Fig. 8

United States Patent Office 3,519,743

Patented July 7, 1970

3,519,743

CIRCUIT ARRANGEMENT FOR SIMULTANEOUS SIGNALLING IN BOTH TRANSMISSION DIRECTIONS BETWEEN TWO TERMINAL STATIONS IN TELECOMMUNICATION SYSTEMS

Eberhard Herter, Stuttgart, Germany, assignor to International Standard Electric Corporation, New York, N.Y., a corporation of Delaware Filed July 12, 1967, Ser. No. 652,909
Claims priority, application Germany, Mar. 11, 1967, St 26,615
Int. Cl. H04l 5/14
U.S. Cl. 178—58 19 Claims

ABSTRACT OF THE DISCLOSURE

A duplex transmission circuit employing simultaneous signalling in both directions in a two-wire system. The transmitted signal received from the distant station is evaluated by logic circuit means that takes into account the instant signal of the local transmitter. Thus no provisions are required for protecting the local receiver from locally transmitted signals. The application demonstrates particularly suitable arrangements for binary, ternary or A.C. simultaneously signalling in both directions over two-wire lines.

Figure 1:
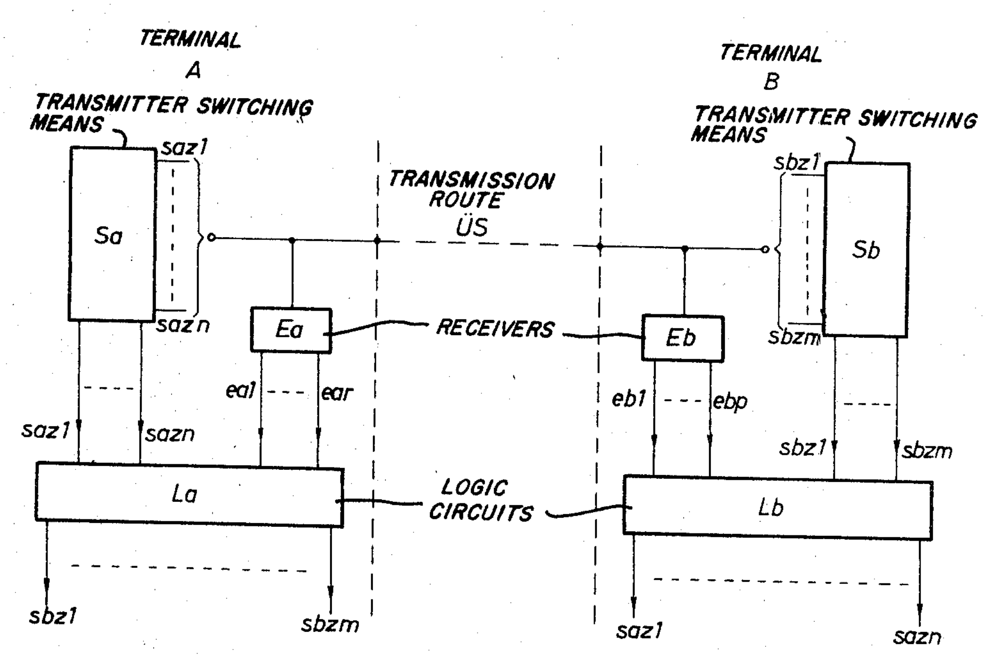

The invention relates to circuit arrangements for simultaneous signalling in both transmission directions in a two-wire mode of operation between two terminal stations of telecommunication systems.

In telecommunication systems it is frequently necessary to transmit simultaneously signals in both transmitting direction between two terminal stations. For example: duplex operation in telegraphy or in data transmission, exchange of signals serving to establish a connection in telephone exchange systems (e.g. loop-interruption signalling via trunk lines) and teleprinting exchange systems, simultaneous transmission of control, acknowledge or condition signals in telecontrol systems etc.

The simplest way for the simultaneous signal transmission in both transmitting directions is the use of two separated channels. These channels can be realized, e.g. by different carrier frequencies or different time positions on a transmission line or a radio link or by separated lines. Separated lines are generally considered as four-wire operation.

Two-wire operation implies one transmitting route or one transmitting channel on a transmitting route used for both traffic direction. In order to simultaneously transmit signals in both directions in two-wire operating systems, particular measures are necessary. Methods known to the art are the use of different signal representations or different signalling rhythms for the two traffic directions. This frequently requires an unsymmetrical construction of the transmitting and receiving switching means of the individual terminal stations.

In order to eliminate this disadvantage it is known to enable a uniform signal representation and a uniform signalling rhythm the local receive switching means is not influenced by signals produced by the local transmitter and which local receive switch means can be influenced only by signals transmitted from the distant terminal station. To this end various solutions are known. For example a mechanical coupling exists between the transmitter key and the receive magnet, in certain known systems in such a way that the local receive magnet cannot move its armature, if the local transmit key is actuated. If, however, the signal produced by actuating the local key, is compensated on the transmission line by an equal signal, transmitted from the distant terminal station, actuation of the local key does not prevent a movement of the armature of the receive magnet. This receive magnet is therefore not influenced by signals produced by the local transmitter through measures which require a mechanical expenditure and exact adjustment. Other known systems apply compensating currents to the local receive magnet during signalling, which prevents its operation, unless signalling occurs at the same time at the distant terminal station. Fluctuations in voltage and scattering of the characteristic values of the receive switching means render this compensation very difficult.

Moreover, the circuit arrangements mentioned are hardly suitable—besides the disadvantages specified above—for other purposes than for a direct current binary signalling according to the single-current or on-off transmission principle.

Other solutions known to avoid any influence of the local receiver by the local transmitter provides bridge-type circuits or hybrid circuits. Such circuits arrangements are used in the so-called duplex operation in the teleprinting technique and are described e.g. in the book by F. Schiweck "Fernschreibtechnik (pp. 436 and 437 of the 4th ed., 1962). In this technique the disadvantage is the necessity of using balancing networks and exact balancing conditions.

All circuit arrangements known to the art and specified above therefore show the feature in common that by a considerable expenditure and only with the aid of reliable balancing conditions it is achieved that a receiver responds only upon signals emitted by the distant terminal station.

A completely different approach is one in which, depending on whether a transmitter contact is in the non-operative or in the operative position a first or a second receive switching means is inserted into a single-wire transmission line. The two receive switching means have different responding thresholds and represent, moreover, different resistances for the transmission line. Despite this expenditure these circuit arrangements known are suitable only for a binary signalling according to the single-current principle.

It is the object of the present invention to provide a circuit arrangement in which the disadvantages of the circuit arrangements known to the art are avoided.

The problem is solved, according to the invention, in that at each terminal station are provided:

(a) Transmit switching means which may take different transmitting conditions and which apply to the transmission route a signal criterion (e.g. voltage of defined direction and/or magnitude), corresponding to their transmitting condition, (b) Receive switching means constantly and effectively connected to the transmission route, which means may enter into different receiving conditions, corresponding to the current and/or voltage conditions on the transmitting route, and (c) Evaluate switching means which provide, due to a logical combination of the transmitting conditions and of the receiving conditions of the transmit and receive switching means, associated to the same terminal station, an information on the transmitting condition of the distant terminal station.

The new way the present invention uses requires no measures to exclude the receive switching means of a terminal station from the influence of the signals, produced by the transmit switching means of the same station. The invention also enables an arbitrary signal representation and the uses of an arbitrary transmission technique. The signals can be equal or different for both transmitting directions.

Another advantageous feature of the invention provides that the transmit switching means associated to a terminal station prepare, depending on the transmitting condition, the receive switching means, associated to the same terminal station for receiving the signaling conditions possible on the transmission route at the said transmit condition and any arbitrary transmit condition of the transmit switching means of the distant terminal station. Thereby the expenditure for the evaluating switching means can be frequently reduced.

In order to achieve a far-reaching elimination of interfering voltage influences the invention furthermore proposes that, when constructing the transmission route as two-wire line, said line is loaded symmetrically by the receive switching means.

Figure 2:
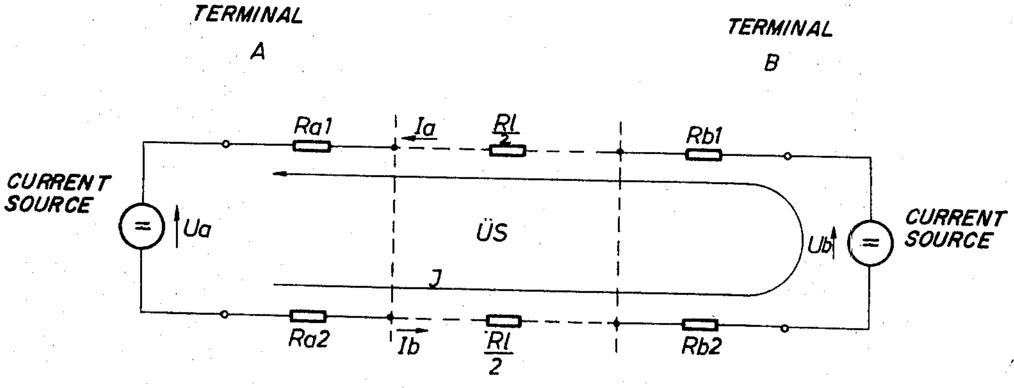
Figure 5:
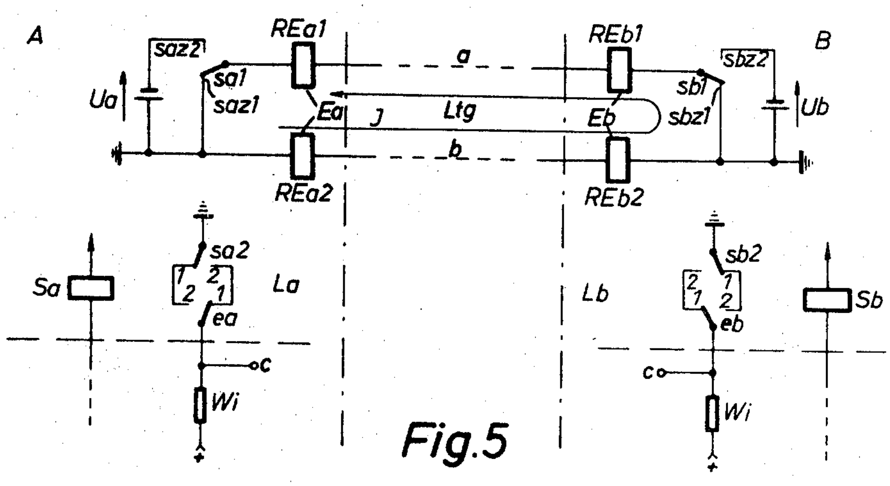
Figure 6:
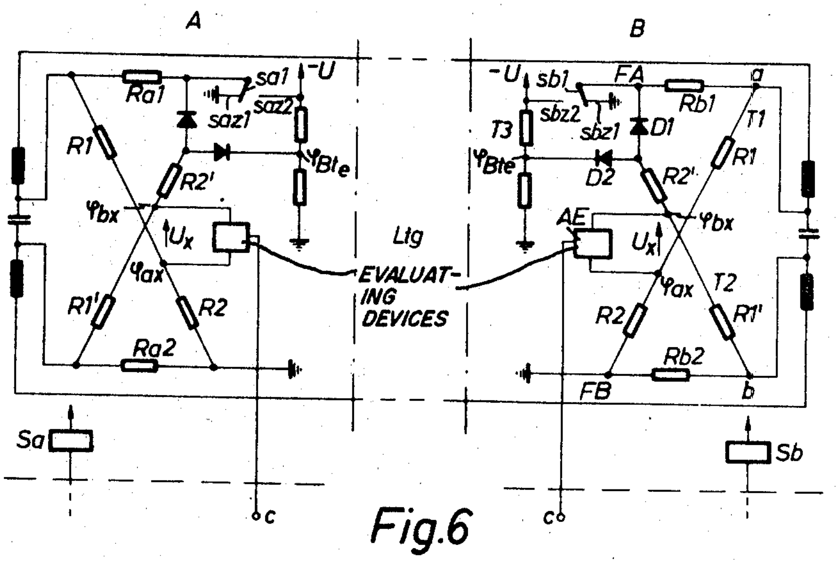
Figure 9:
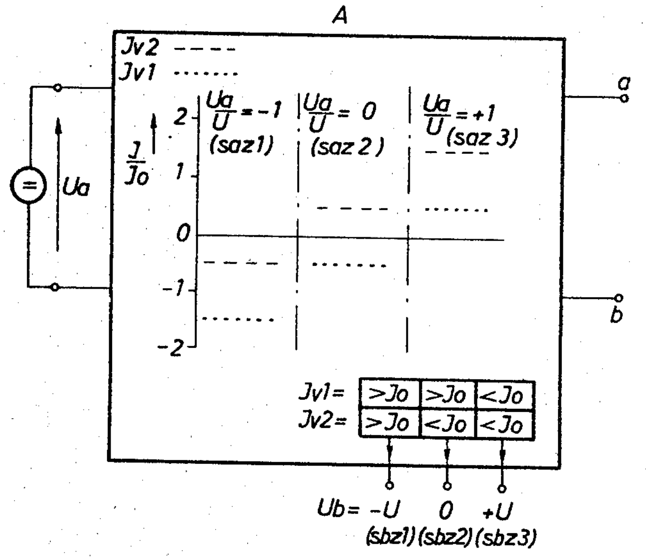
Figure 10:
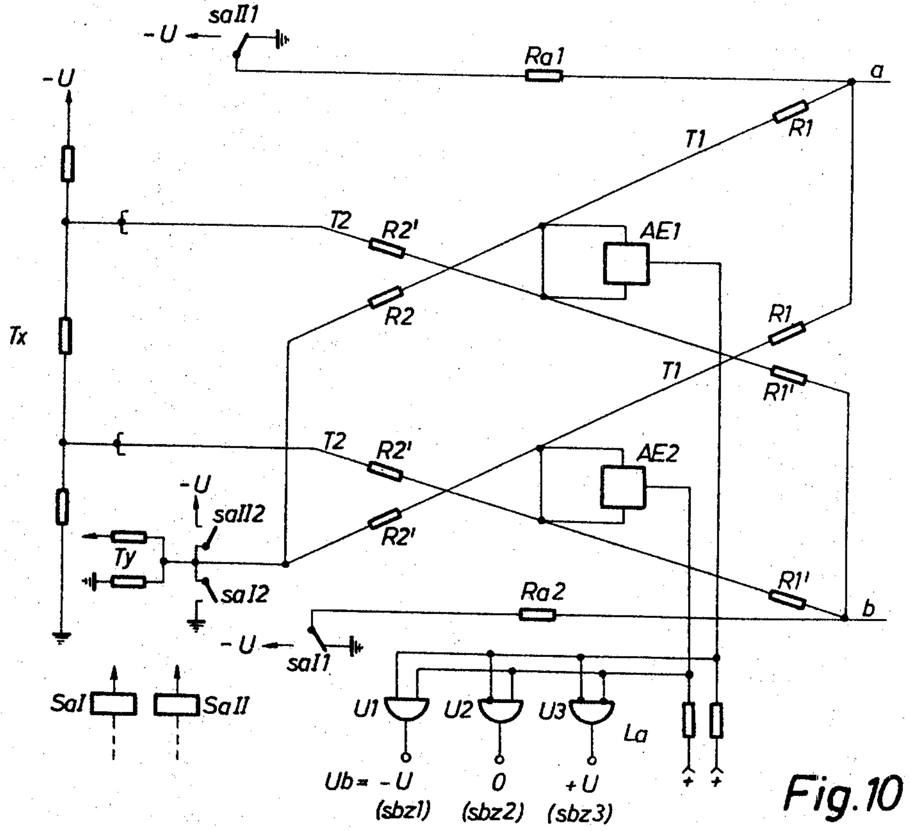

The invention is in detail explained, together with its further features and advantages, with the aid of the accompanying drawings, wherein:

FIG. 1 shows a block diagram, representing the basic principle of the invention, FIG. 2 shows a sketch to make clear the mode of operation of the circuit arrangement according to FIG. 1, FIG. 3 shows a table of signal conditions appearing on the line as defined signal voltages, FIG. 4 shows a table of values preferred according to the invention for binary signals according to the single current principle, FIG. 5 shows an example of the present invention for binary signalling, FIG. 6 shows another example according to the present invention for binary signalling, FIG. 7 shows a table for values preferred, according to the invention, for binary signalling based on the double-current principle, FIG. 8 shows a table of values preferred, according to the invention, for a ternary signalling, FIG. 9 shows a sketch to explain the evaluation of values according to FIG. 8, and FIG. 10 shows an example for a ternary signalling according to the present invention, FIG. 1 shows in a block diagram only these devices of two terminal stations A and B, which are necessary to understand the idea of the invention. The terminal stations are interconnected via a transmission route US. S*a* designate the transmit switching means of terminal A. Said transmit switching means may acquire *n* different transmitting conditions, as indicated by the outputs *saz*1 to *sazn*. At each transmit condition an individual signal is applied to the transmission route. The individual signals can be transmitted by applying voltages of defined magnitude and/or polarity to a line. When using a time channel of a TDM-transmission line as a transmission route US, said voltages can be considered as modulated pulses, appearing at the corresponding time slots. The voltage may be used also to modulate a carrier frequency voltage, whereby the modulated carrier frequency signal is transmitted in a frequency channel of a line or a radio link. A DC-voltage or an AC-voltage may be used as signal voltage. However, in case of an AC-voltage the voltage sources used at both terminal stations, must be synchronized.

For reasons of simplicity, it is assumed that the transmission route US is a line and that each individual signal is transmitted by applying a DC-voltage of defined magntiude and polarity to said line. Even without considering the terminal station B, the *n* possible transmitting conditions *saz*1–*sazn* of the transmit switch means S*a* applies the same number (*n*) of different current or voltage conditions to the line. The terminal station B is also equipped with transmit switching means S*b* which may have *m* different transmitting conditions *sbz*1 to *sbzm* (*m* may be equal or unequal to *n*) and which means also applies a voltage of defined magnitude and polarity to the line for each transmitting condition. Therefore *s* possible current conditions or voltage conditions on the line result. The magnitude of *s* depends on the mutual relation of the voltages, used at both terminal stations.

A receiver E*a* or E*b* respectively is provided at each terminal station which receiver is constantly influenced by the voltage or current conditions prevailing on the line US. In the following paragraphs the conditions on the line are considered with regard to currents. The number of current conditions to be evaluated selectively at each of the receivers E*a* and E*b* is indicated with *r* and *p* respectively and shown by the outputs *ea*1–*ear* and *eb*1–*ebp*. The values of *p* and *r* may differ or may be equal, depending on the mutual relationship of the voltages used at the terminals A and B and on the values *n* and *m* selected. In any case, *p* and *r* may be equal to the value *s* at the maximum. With regard to the magnitude of values *p* and *r* a more detailed explanation will follow.

A logic circuit L*a* and L*b* is provided at each terminal station. The logic circuit L*a* of the terminal station A forms by a logical combination of the transmitting condition *saz*1–*sazn* and of the receive condition *ea*1–*ear*, an information on the transmit condition *sbz*1–*sbzm* just prevailing at the transmit switching means *sb* of the distant terminal station B. The function of the logic circuit L*b* of the terminal station B is an analog one; it forms an information on the prevailing transmit condition *saz*1–*sazn* from the informations on the transmit conditions *sbz*1–*sbzm* and on the receive condition *eb*1–*ebp*.

For a closer explanation of the mode of operation of the circuit arrangement according to FIG. 1 consider FIG. 2 and the table in FIG. 3. In FIG. 2 the line-resistance US is represented symbolically by a resistor R1 subdivided onto both its wires. R*a*1 and R*a*2 are the resistances inserted into the line at the terminal station A (e.g. supply resistors, receiver resistors, transmitter impedances etc.) the same applies for the resistances R*b*1 and R*b*2 at the terminal station B. At each terminal station a DC-voltage source U*a* and U*b* respectively, is shown representing symbolically the respective transmitter or the voltage source connected by said transmitter. The direction of the arrow is defined to be the positive direction. Therefore a current J will flow in the line, the magnitude of which is defined by the equation $$J=\frac{Ua-Ub}{4R+R1} \qquad (1)$$

assuming that R*a*1, R*a*2, R*b*1 and R*b*2 have all the same value R.

The mode of operation is simplified, if a standardization is introduced with regard to a current $$Jo=\frac{U}{4R+R1}$$

At this point a remark shall be added for a practically important mode of operation. Frequently the supply voltage sources at both terminal stations are grounded at an arbitrary point, so that the currents J*a* and J*b* in both wires (see FIG. 2) normally have a different magnitude. For example: if, in FIG. 2, U*a* and U*b* are grounded at the positive pole, J*b* becomes zero and $$Ja=\frac{Ua-Ub}{2R+R1/2}$$

In order to eliminate the influence of the longitudinal currents which flow in both wires in the same direction, caused e.g. by heavy current influences, "symmetrically" operating receive circuits are used. The circuit arrangements evaluate the arithmetic mean of the currents flowing in the wires, i.e.

$$\frac{Ja+Jb}{2}=J=\frac{Ua-Ub}{4R+R1}$$

Assuming that such receive switching means are used, it is meaningless, whether the supply voltages are grounded or not. In the following explanation the simple case is considered:

$$Ja=Jb=J$$

The table in FIG. 3 now indicates which currents may occur, if at the different transmitting conditions in both terminal stations A and B the indicated, arbitrarily selected voltages are effective. The number of transmitting conditions is also chosen arbitrarily with $n=3$ and $m=2$. As may be gathered from the table derived from Equation 1, when using $Ua/U=+1$ at *saz*1, $Ua/U+2$ at *saz*2 and $$\frac{Ua}{U}=-\frac{5}{2}$$

at *saz*3, U similarly $Ub/U=1$ at *sbz*1 and $Ub/U=-1U$ at *sbz*2, and six possible current conditions may be present on the line. For example, the value +1 indicates the standardized current value $J/Jo$ on the line, if the transmitting conditions *saz*2 and *sbz*1 prevail simultaneously. Therefore the solution for *s* according to the table of FIG. 3 is: $s=6$.

In the following we have to discern between receive circuit arrangements which are dependent on the current direction (e.g. polarized relays) and receive circuit arrangements which only depends on the amplitude of the current (e.g. normal relays).

As may be gathered from the table in FIG. 3 it is sufficient to selectively evaluate for the receiver E*a* only $r=2$ values of the current, if the respective transmit condition *saz*1, *saz*2 or *saz*3 is taken in consideration for the information with regard to the transmit condition *sbz*. The evaluation can be performed, according to the invention, with a simple threshold value detector, independent of the current direction (e.g. a normal relay), the responding threshold of which is set approximately to the value $$\left|\frac{J}{Jo}\right|=\frac{7}{4}$$

It is assumed that the output signal *ea*1 of the receiver indicates a value below the threshold value and that the output signal *ea*2 indicates a value exceeding said threshold value. The following equations then apply at the terminal station A:

$$\left.\begin{matrix} ea1+saz1=sbz1 \\ ea1+saz2=sbz1 \end{matrix}\right\} ea1+(saz1 \text{ or } saz2)=sbz1$$

$$ea1+saz3=sbz2$$

$$\left.\begin{matrix} ea2+saz1=sbz2 \\ ea2+saz2=sbz2 \end{matrix}\right\} ea2+(saz1 \text{ or } saz2)=sbz2$$

$$ea2+saz3=sbz1.$$

The Logic L*a* therefore only has to form the combinations corresponding to said equations (e.g. by simple AND-circuits), in order to provide a distinct information on the respectively prevailing transmit condition at the terminal station B. The receiver can thereby be a normal relay.

For the receiver E*b* the condition is somewhat more complicated, because it must selectively discern $p=4$ current conditions. A threshold value detector is used again as a receiver which may have three threshold values $$\left|\frac{J}{Jo}\right|=\frac{1}{2}, \frac{7}{4} \text{ and } \frac{5}{2}$$

The output signal *eb*4 appears if all three threshold values are exceeded, the output signal *eb*3 appears if two threshold values are exceeded, *eb*2 appears if one threshold value is exceeding, *eb*1 appears if no threshold values are exceeding. The logic L*b* must then perform the following combinations:

$$eb4+sbz2=saz2$$
$$eb4+sbz1=saz3$$
$$eb3+sbz2=saz1$$
$$eb2+sbz2=saz3$$
$$eb2+sbz1=saz2$$
$$eb1+sbz1=saz1$$

The table shows that the output signals *eb*3 and *eb*1 give a direct information on the transmit condition *saz*1; the output signals *eb*4 and *eb*2 give information regarding the transmit condition *sbz*1 or *sbz*2. It also reveals that at the transmt condition *sbz*2 the output signal *eb*1 cannot occur and at the transmit condition *sbz*1 the output signal *eb*3 cannot appear. That means: depending on transmit condition *sbz*1 or *sbz*2 only $p=3$ current values must be selectively considered. To obtain this effect, the threshold values of the receiver can be switched-over under control of the transmitter, in order to consider only two of the three indicated threshold values, according to the present invention. By partly inserting the logical circuit into the receiver the expenditure can be reduced eventually.

The example given concerns completely arbitrarily selected values in order to explain the invention and its possibilities. In a further embodiment of the invention a far reaching simplification of the receivers and/or of the logic can be achieved if the values are wisely selected.

According to the invention it is proposed for a binary signal transmission on the on-off principle (i.e. current or not current), in which $n=m=2$ to select for *saz*1 and *sbz*1

$$\frac{Ua}{U}=\frac{Ub}{U}=0$$

and for *saz*2 and *sbz*2

$$\frac{Ua}{U}=\frac{Ub}{U}=+1$$

FIG. 4 shows the corresponding table. In this case $s=3$ ($J/Jo=1$, $-1$ or 0), but it is sufficient to selectively consider in each of the receivers E*a* and E*b* only $r=p=2$ current conditions, for example with the aid of a threshold value detector, being independent of the current direction. The threshold value of the detector is set to approximately $$\left|\frac{J}{Jo}\right|=\frac{1}{2}$$

The receiver can be a normal relay, the responding current value of which is $$\left|\frac{J}{Jo}\right|=\frac{1}{2}$$

FIG. 5 shows an example for such a case. Each of the receivers E*a* and E*b* consists of a relay RE*a* or RE*b*, respectively. The windings of these relays are equally subdivided to both wires *a* and *b* of the line L*tg*. In the non-operative condition both transmit switching means S*a* and S*b* are switched-off and their contacts *sa*1 and *sb*2 are in the non-operative position shown at *saz*1 and *sbz*1, respectively. No current flows in the loop RE*a*1, *a*, RE*b*1, *sb*1, RE*b*2, *b*, RE*a*2, *sa*1. Relay S*a* is energized if a signal is to be transmitted from A to B. Through its contact *sa*1 which reverses into position *saz*2, the voltage U*a* becomes effective in the loop and therefore a current J ($J/Jo=1$) flows in said loop. Relay RE*a* as well as relay RE*b* respond. If a signal shall be transmitted simultaneously from B to A, relay S*b* is energized too, reversing its contact S*b*1 into the position *sbz*2 and applying voltage U*b* to the loop. As, according to FIG. 4

$$\frac{Ua}{U}=\frac{Ub}{U}=1$$

the resulting current is $J=0$, according to the Equation 1. Both relays RE$a$ and RE$b$ have dropped. If only the terminal station B transmits, a current $-J$ ($J/Jo=-1$) will flow in the line, as it is evident without further explanation, and, consequently, both relays will respond. for the logic, L$a$ or L$b$ respectively, then applies, as may be gathered from the table in FIG. 4.

| | |
|---|---|
| $ea1+saz1=sbz1$ | $eb1+sbz1=saz1$ |
| $ea1+saz2=sbz2$ | $eb1+sbz2=saz2$ |
| $ea2+saz1=sbz2$ | $eb2+sbz1=saz2$ |
| $ea2+saz2=sbz1$ | $eb2+sbz2=saz1$ |

The logic L$a$ and the logic L$b$ can then be provided, according to the invention, each as an Exclusive OR-circuit, formed as shown in FIG. 5 by a change-over contact $sa$2 and $sb$2 respectively of the transmit switching means and a change-over contact $ea$ and $eb$, respectively of the receive relay. (Of course any other suitable logic may be be used.

The appearance of ground potential at the terminal $c$ of the logic L$a$ or L$b$ then means that a signal has been received from the distant terminal station. It is of advantage for the circuit arrangement according to FIG. 5 to load the line symmetrically by the receiver so that longitudinal interfering voltages (e.g. from heavy-current lines) do not influence the result of the evaluation.

FIG. 6 shows another example of the invention for the case given in FIG. 4, to be explained now with the aid of the facilities at the terminal station B. The resistors inserted into the line L$tg$ may be e.g. feed resistors of a trunk line in a telephone exchange system. Two voltage dividers T1 and T2 are shown; one comprises the resistors R1 and R2, the other one the resistors R1' and R2'. The divisional ratio is preferably for both voltage dividers equal to $k$. With one of their terminal points, each of the voltage dividers T1 and T2 tap the voltage on the line. Between the other terminals FA, FB a comparing voltage is effective. An evaluating device AE is inserted between the connecting points of the partial resistors of both voltage dividers T1 and T2, the output voltage of which evaluator appears at the terminal $c$. The magnitude of the effective comparing voltage depends on the position of contact $sb$1 of the transmitting device S$b$. In position $sbz$1 the wire $a$ (as well as the wire $b$) is grounded and the comparing voltage is the difference between the negative potential $\varphi$B$te$, derived at a voltage divider T3, and ground (via diode D2). In the transmitting condition $sbz$2, however, the wire $a$ is connected to potential $-$U, which potential is also effective at the terminal point FA of the voltage divider T2 (via diode D1). Because the wire $b$ and the terminal point FB are grounded, the entire voltage $-$U serves as comparing voltage. If the comparing voltage is designated with U$v$, the tapped line voltage with U$ab$, and the voltage applied to the evaluating dedevice AE; $\varphi ax\varphi x$ with U$x$, then applies $$(2) \qquad Ux=kUab+(l-k)Uv$$

There exist two degrees of freedom (U$r$ and $k$) to determine a threshold value of U$ab$, for which $Ux=0$. The sign of the voltage U$x$ (and thus the output signal at terminal $c$) then indicates, whether the threshold value has been exceeded or has not been reached. The circuit arrangement of the terminal station A is analog. By controlling the effective comparing voltage presented by the transmitter, it is acheived that at each terminal station the output signal at the terminal $c$ directly indicates the transmitting condition of the distant terminal station, because the voltage U$x$ has one polarity. If the distant terminal station transmits and has the opposite polarity, then the distant terminal station is inoperative. In other words: a signal received from the distant terminal station always effects the same change of direction of the voltage U$x$. According to the invention, the receiver is influenced, as shown in FIG. 6, by the transmitter in such a way that a separate receiver logic is superfluous.

Instead of switching the comparing voltage, other partial resistors of the voltage dividers T1, T2 may be switched in. As may be gathered from the Equation 2 the threshold value can be changed, too, therewith. Also a combined switching of comparing voltage and divisional ratio is possible.

The circuit arrangement explained with the aid of FIG. 6 may also be used without a transmitter-controlled changing of the threshold value, if a separate logic is provided for combining transmitting and receiving condition.

The circuit arrangements shown in FIGS. 5 and 6, or the principle they are based upon, can be applied also for binary signalling according to a double current system, for which the signal voltages U$a$ and U$b$ can be selected corresponding to the values indicated in the table on FIG. 7. When selecting these values, an additional advantage is obtained in having larger range between the current values $J/Jo=0$ and $J/Jo=\pm 2$ to be discerned selectively. It is not necessary that the receivers are sensitive for current direction. A further explanation of FIG. 7 is deemed superfluous in view of the explanations given for FIGS. 4 to 6. It is pointed out only that, when using a simple threshold device as receiver (e.g. a relay), a threshold value of e.g. $|J/Jo|=1$ may be selected.

The circuit arrangement according to FIG. 6 offers the advantage of a far reaching insensitivity against induced longitudinal interfering voltages.

As already mentioned, an AC-voltage may be used too as signal voltage, if the AC-voltage sources of both terminal stations are synchronized. Co-phase voltages of same frequency and different amplitudes may be used. Also a phase shift of 180° may be used, for signalling, corresponding to a polarity reversal of the DC-voltage. For receiving, AC-receivers or rectifiers and DC-receivers may be used. If a circuit arrangement according to FIG. 6 is used as an AC-receiver, an AC-voltage may be used as comparing voltage for example and each half wave may be evaluated individually.

FIG. 8 indicates in a standardized representation values which are advantageous, according to the invention, for a ternary signalling. An example of a circuit for receiving and evaluating according to the invention is shown in FIG. 10 and its mode of operation is explained in detail with the aid of FIG. 9. In FIG. 9 the devices of the terminal A are indicated by the framed portion. The wires of the line are connected to the terminal clamps $a$ and $b$, U$a$ is the transmitting voltage. Within the framed part a diagram is shown in which, in the sections for $Ua/U=-1$, $Ua/U=0$ and $Ua/U=+1$ (i.e. for $saz$1, $saz$2 and $saz$3) the threshold values $Jv$1 and $Jv$2 are used for the receiver. It is therefore sufficient at each transmitting condition $saz$ to consider selectively only $p=3$ current conditions in order to give an information on the transmitting condition $sbz$. If the transmitting condition $saz$ is taken into account, thereby, however, the threshold values differ. (Considering the explanations given for the tables in FIGS. 3 and 4 this should be clear without further explanation). As indicated in the framed part on bottom right of FIG. 9, the transmitting condition $sbz$1 prevails, if both threshold values are exceeded, for the transmitting condition $sbz$2 only the top threshold value falls short and for $sbz$3 both threshold values fall short. If no switch-over of the threshold values would be made, then $p=5$ current values should be selectively discerned and therefore four threshold values would have to be provided.

Considering the explanation of FIG. 6, mode of operation of the circuit arrangement shown in FIG. 10 will be easily understandable. Substantially this figure means a duplication of the circuit arrangement according to FIG. 6 in that for the two threshold values to be set an arrangement for each is provided, consisting of two voltage dividers and an evaluating device AE1 and AE2, respectively.

The evaluating devices are arranged thus that they render a signal only if the threshold value is exceeded. The voltage dividers of both circuits tap, as shown in FIG. 6, the voltage on the line at the wires *a* and *b* (with the resistors R1 and R1′). At the other terminal points of the voltage dividers (resistors R2, R2′) of both circuits different voltages are effective which are tapped at the voltage dividers T*x* and T*y*. Considering the teaching of Equation 2, the divisional ratio *k* of all voltage dividers can be built up equally and the different threshold values can be obtained through suitably selected, different comparing voltages. Shifting of both threshold values is obtained through contacts *sa*I1, *sa*I2, *sa*II1, *sa*II2 of the transmitting devices SaI and SaII. Of these devices neither is excited in the transmitting condition *saz*2. In the transmitting condition *saz*1 only *Sa*II is operated and in condition *saz*3 only S*a*I is excited. Corresponding to the explanations given for FIG. 9, the logic circuit L*a* can be made very simple. The AND-circuit U1 indicates the transmitting condition *sbz*1 when both threshold values are exceeded. If the current falls short of the top threshold value, but exceeds the bottom threshold value, the gate circuit U2 indicates the transmitting condition *sbz*2. If the current falls short of both threshold values, the gate U3 evaluates this to indicate the transmitting condition *sbz*3. Since a NOT condition must be met, U3 should be a "neither-nor" circuit, or an AND-circuit, if, it is actuated via inverter stages.

Another possibility for the case given in FIG. 8 would be the use of receiving devices with two threshold values and dependence on the current direction.

The deliberations made for FIG. 6 with regard to the different possibilities of switching over the threshold values and the applicability on AC-signalling also apply for FIG. 10.

The evaluation can be made in all cases with a certain delay, in order to consider transient phenomena on the line.

The circuit arrangements shown on the drawings represent examples only. To apply the invention other circuit arrangements are suitable, too. In practice one will distribute the expenditure necessary to the receiving devices and to the logic in the way desired. The same applies for the selection of the signal criteria. While the invention was primarily described with a view to current, the same is possible with a view to voltage as is evident. The consideration with regard to voltage may be of advantage, if the receiving devices are connected through high-ohmic impedances in parallel to the line in order to evaluate the voltages prevailing on a line, that is terminated with high-ohmic impedances.

What is claimed is:

1. A two-wire mode circuit arrangement for simultaneously signalling in both transmission directions between local and distant telecommunication terminal stations,
- each of said local and distant terminal stations comprising transmitting devices,
- said transmitting devices each having a plurality of transmitting conditions respectively,
- transmission path means connecting said local and said distant terminal stations,
- said transmitting devices being connected to said transmission path means to apply thereto different signals corresponding to the different transmitting conditions, respectively,
- receiving devices at each of said terminal stations connected to the said transmission path means,
- each of said receiving devices providing different outputs corresponding to the different signal conditions on said transmission path means responsive to the collective transmitting conditions of both of said transmitting devices,
- and logic circuit means for evaluating the transmitting condition of said transmitting device at the distant terminal station responsive to the transmitting condition of said local transmitting device and the output of said local receiving device.

2. The circuit arrangement according to claim 1 wherein each of said receiving devices comprise threshold value detectors, wherein said detectors provide a number of threshold values corresponding to the number of the different signals to be evaluated.

3. The circuit arrangement according to claim 2 wherein means are provided for controlling the threshold values of the receiving devices responsive to the transmitting conditions of said transmitting devices.

4. The circuit arrangement according to claim 2 wherein said arrangement utilizes means for transmitting binary signal having on-off conditions,
- wherein each of said receiving devices at both said distant and said local terminal stations utilize only a single threshold value,
- wherein each of said transmitting devices at both said distant and said local terminal station have a first and second transmitting condition,
- a first voltage source at each of said stations,
- each of said first voltage sources furnishing voltages of equal magnitude and polarity,
- a second voltage source at each of said stations, each of said second voltage source furnishing voltages of equal magnitude and opposite polarity to said first voltage source,
- means for connecting said first and second voltage sources to said transmission path means at the stations responsive to said transmitting means being in a first of the two transmitting conditions at each of said terminal stations whereby in said first of said two transmitting conditions of each of said stations the voltages cancel each other out on the transmission path means.

5. The circuit arrangement of claim 2 wherein said arrangement utilizes means for transmitting binary signals having positive or negative polarities,
- said receiving devices of both of said terminal stations each having only one threshold value,
- said transmitting devices having a first and a second transmitting condition,
- a first voltage source at each of said transmitting stations having a first amplitude and a first polarity,
- a second voltage source at each of said terminal stations having a second amplitude equal to said first amplitude and a second polarity opposite to said first polarity,
- whereby the voltages at the connection of each of said terminal stations to the transmission path means cancel each other when both transmitting devices are both in the first or second condition but add to each other when one of said transmitting devices is in the first condition while the other of said transmitting devices is in the second condition.

6. The circuit arrangement according to claim 5 wherein the receiving devices are relays.

7. The circuit arrangement according to claim 6 wherein each of the receiving device relays have two windings,
- said transmission path means comprising a two-wire line,
- and each of said windings being serially inserted into both wires of the line.

8. The circuit arrangement according to claim 5 wherein each of receiving devices comprises a first and a second voltage divider, and evaluating means connected between tappings in each of said voltage dividers,
- said voltage dividers being connected at one end to the two-wire line and at the other end to comparing voltage source means,
- whereby the magnitude of the voltages at said comparing voltage source means together with the ratio of the voltages across the impedances of the voltage dividers determine the threshold values of the receiving devices.

9. The circuit arrangement according to claim 7 wherein the said evaluating device comprises exclusive-OR circuits, means responsive to the condition of the local transmitting and receiving devices for controlling the said exclusive-OR circuit at said local terminal station.

10. The circuit arrangement according to claim 9 wherein said exclusive-OR circuit comprises change-over contact means, and means for controlling the change-over contact means responsive to the operations of said transmitting devices and said receiving relays.

11. The circuit arrangement according to claim 8 wherein means are provided for controlling the amplitude of the comparing voltage from said comparing voltage source means at the terminal points of the voltage divider responsive to operation of said local and distant transmitting devices whereby the output signal of the evaluating means indicates the transmitting condition of the distant terminal.

12. The circuit arrangement of claim 8 wherein means are provided for controlling the divisional ratio of the impedances of the voltage dividers responsive to the operation of the local and distant transmitting devices whereby the output signal of the evaluating device indicates the transmitting condition of the distant terminal.

13. The circuit arrangement according to claim 2 used with ternary signalling wherein means including said transmitting devices at each of said stations are provided for connecting a first voltage to said transmission path means responsive to said transmitting devices being in said first transmitting condition, means responsive to said transmitting device at each of said station being in a second transmitting condition for connecting a second voltage to said transmission path means equal in amplitude to the first voltage but of the opposite polarity, means responsive to said transmitting devices at each of said stations being in a third transmitting conditon for providing a zero voltage connected to said transmission path means, and means including said receiving devices for operating responsive to said zero voltage.

14. The circuit arrangement according to claim 13 wherein the receiving devices are provided with two threshold values operated responsive to the direction of the line current.

15. The circuit arrangement according to claim 13 wherein said receiving devices at each terminal comprise a pair of voltage dividers, and evaluating devices extending between said voltage dividers.

means for coupling one side of each of said voltage dividers with the transmission path means, and means for coupling the other side of each of said voltage dividers to comparison voltage sources.

16. The circuit arrangement according to claim 15 wherein means are provided for controlling the voltages obtained from said comparison voltage sources responsive to the operation of said transmitting devices.

17. The circuit arrangement according to claim 15 wherein means are provided for controlling the divisional impedance ratio of each said voltage dividers responsive to the operation of said transmitting devices.

18. The circuit arrangement according to claim 16 wherein said evaluating devices comprise means for furnishing an output signal only when a threshold value is exceeded, means whereby said transmitting devices set the threshold value, first gate means operated responsive to the coinciding appearance of output signals of both evaluating devices to indicate a first transmitting condition at the distant terminal station, second gate means responsive to an absence of an output from either of said evaluating devices for indicating a second transmitting condition, and third gate means operated responsive to an output from only one of said evaluating devices to indicate a third transmitting condition at said distant station.

19. The circuit arrangement according to claim 1 wherein said receiving devices load said transmission path means symmetrically.

References Cited

UNITED STATES PATENTS

| | | | |
|---|---|---|---|
| 2,496,372 | 2/1950 | Barrett | 178—58 |
| 2,569,926 | 10/1951 | Fay | 178—58 |
| 2,802,050 | 8/1957 | Mahoney | 178—59 |

THOMAS A. ROBINSON, Primary Examiner

U.S. Cl. X.R.

178—4.1; 340—163